United States Patent
Butz, Jr. et al.

(10) Patent No.: US 9,283,478 B2
(45) Date of Patent: Mar. 15, 2016

(54) SUICIDE PLAYER POOL FANTASY SPORTS GAMES

(71) Applicant: Suicide Fantasy Sports, LLC, Newfield, NJ (US)

(72) Inventors: James F Butz, Jr., Newfield, NJ (US); Eric L. Butz, Malaga, NJ (US)

(73) Assignee: Suicide Fantasy Sports, LLC, Newfield, NJ (US)

( * ) Notice: Subject to any disclaimer, the term of this patent is extended or adjusted under 35 U.S.C. 154(b) by 240 days.

(21) Appl. No.: 13/970,512

(22) Filed: Aug. 19, 2013

(65) Prior Publication Data

US 2013/0337921 A1    Dec. 19, 2013

Related U.S. Application Data

(63) Continuation of application No. 12/854,057, filed on Aug. 10, 2010, now Pat. No. 8,512,148.

(60) Provisional application No. 61/232,746, filed on Aug. 10, 2009.

(51) Int. Cl.
*A63F 13/828* (2014.01)
*A63F 13/30* (2014.01)

(52) U.S. Cl.
CPC .............. *A63F 13/12* (2013.01); *A63F 13/828* (2014.09); *A63F 2300/554* (2013.01); *A63F 2300/69* (2013.01)

(58) Field of Classification Search
CPC ... A63F 13/12; A63F 13/828; A63F 2300/55; A63F 2300/69; A63F 2300/8052; A63F 2300/554
See application file for complete search history.

(56) References Cited

U.S. PATENT DOCUMENTS

| 5,018,736 A | 5/1991 | Pearson et al. |
| 2006/0252476 A1 | 11/2006 | Bahou |
| 2008/0287198 A1 | 11/2008 | Callery et al. |

OTHER PUBLICATIONS

"2007 SprintSpeed™Fantasy Rules." *CBS Interactive, Inc.* 2007.
"Draft Position and the rest of the 2007 NFL Season." *SportingNews.* Oct. 3, 2007. *Wayback Machine.* Web. Dec. 31, 2013.
"FFTOC's NFL Playoff Challenger™." *FantasyFootballTOC.* May 15, 2008. *Wayback Machine.* Web. Nov. 21, 2013.
"FFTOC-Style Fantasy Football for the 2007 NFL Regular Season . . . " *FantasyFootballTOC.* May 14, 2008. *Wayback Machine.* Web. Nov. 21, 2013.
"Pick-A-Pro Official Rules." *SportsLine.com, Inc.* 2006.
"Survivor Fantasy Leagues." *Wikipedia: the Free Encyclopedia.* Wikimedia Foundaton, Inc. Aug. 14, 2007. Web. Dec. 13, 2013.
LaBert, D. "Welcome to the Jungle" The Fantasy Football Tournament of Champions (FFTOC). *FantasyTailgate.* Jul. 9, 2008. *Wayback Machine.* Web. Nov. 21, 2013.

*Primary Examiner* — Damon Pierce
(74) *Attorney, Agent, or Firm* — Mintz Levin Cohn Ferris Glovsky and Popeo, P.C.

(57) ABSTRACT

Methods, systems, articles, and the like related to fantasy sports games are described. In various aspects, a selection of a fantasy roster for a first game period can be received from a fantasy sports participant. The fantasy roster can include one or more selected real players selected by the fantasy sports participant from a pool of eligible real players who are eligible for use by the fantasy sports participant during the first game period. Statistics representative of performance of the selected real players during the first game period can be recorded and a total season score for the fantasy sports participant can be adjusted based on the recorded statistics. The pool of eligible real players for use by the fantasy sports participant during a second game period that follows the first period can be updated by deleting the selected real players from the pool.

26 Claims, 6 Drawing Sheets

| Quarterback | Rushing Yards | Passing Yards | Points Scored |
|---|---|---|---|
| Running Back | Rushing Yards | Catch Yardage | Points Scored |
| Wide Receiver | Rushing Yards | Catch Yardage | Points Scored |
| Tight End | Rushing Yards | Catch Yardage | Points Scored |
| Kicker | | | Points Scored |

| Suicide Fantasy Football Draft Page | | |
|---|---|---|
| Players | Position | Points |
| Choose your Quarterback — Pick Player | | |
| Choose your Running Back — Pick Player | | |
| Choose your Running Back — Pick Player | | |
| Choose your Wide Receiver — Pick Player | | |
| Choose your Wide Receiver — Pick Player | | |
| Choose your Tight End — Pick Player | | |
| Choose your Place Kicker — Pick Player | | |

FIG. 3

FIG. 4

| Choose Player | | | | | |
|---|---|---|---|---|---|
| Name 402 | Team 404 | Position 406 | Opponent 410 | Points 412 | Column - Pick Players 414 |
| Adrian Peterson | MIN | RB | GB | 64 | Pick Player |
| Chris Johnson | TEN | RB | JAC | 64 | Pick Player |
| Maurice Jones-Drew | JAC | RB | TEN | 59 | Pick Player |
| Willis McGahee | BAL | RB | NE | 57 | Pick Player |
| Frank Gore | SFO | RB | STL | 54 | Pick Player |
| Julius Jones | SEA | RB | IND | 47 | |
| Fred Jackson | BUF | RB | MIA | 46 | Pick Player |
| Cedric Benson | CIN | RB | CLE | 45 | Pick Player |
| Ronnie Brown | MIA | RB | BUF | 42 | Pick Player |
| Darren Sproles | SDG | RB | PIT | 39 | |
| DeAngelo Williams | CAR | RB | BYE | 36 | Pick Player |
| Marion Barber | DAL | RB | DEN | 35 | Pick Player |
| Ryan Grant | GNB | RB | MIN | 34 | |
| Ray Rice | BAL | RB | NE | 34 | Pick Player |
| Steven Jackson | STL | RB | SF | 33 | Pick Player |
| Ricky Williams | MIA | RB | BUF | 33 | Pick Player |
| Michael Turner | ATL | RB | BYE | 32 | Pick Player |
| Kevin Smith | DET | RB | CHI | 32 | Pick Player |
| Tim Hightower | ARI | RB | BYE | 32 | Pick Player |
| Correll Buckhalter | DEN | RB | DAL | 31 | |
| Thomas Jones | NYJ | RB | NO | 30 | Pick Player |
| Fred Taylor | NWE | RB | BAL | 30 | Pick Player |
| Felix Jones | DAL | RB | DEN | 29 | Pick Player |
| Joseph Addai | IND | RB | SEA | 29 | Pick Player |

400

| Suicide Fantasy Football Draft Page | | | |
|---|---|---|---|
| Players | | Position | Points |
| Brett Favre, MIN | Locked | QB | 50 |
| Maurice Jones-Drew, JAC | Locked | RB | 59 |
| Cedric Benson, CIN | Locked | RB | 45 |
| Donald Driver, GB | Locked | WR | 35 |
| Hines Ward, PIT | Locked | WR | 24 |
| Chris Cooley, WAS | Locked | TE | 24 |
| Nate Keading, SD | Locked | K | 31 |

SUICIDE PLAYER POOL FANTASY SPORTS GAMES

CROSS REFERENCE TO RELATED APPLICATION

The current patent application is a continuation of U.S. patent application Ser. No. 12/854,057, filed on Aug. 10, 2010, now U.S. Pat. No. 8,512,148, and entitled "SUICIDE PLAYER POOL FANTASY SPORTS GAMES," which claims the benefit of U.S. Provisional Patent Application Ser. No. 61/232,746, filed on Aug. 10, 2009 and entitled "SUICIDE PLAYER POOL FANTASY SPORTS GAMES." All the above-referred applications to which the current application claims priority are incorporated by reference herein in their entireties.

TECHNICAL FIELD

The subject matter described herein relates to computer-based fantasy sports games.

BACKGROUND

The Fantasy Sports Trade Association estimates that 29.9 million people in the U.S. and Canada played fantasy sports in 2007. Fantasy sports is estimated to have a $3-$4 Billion annual economic impact across the sports industry. An estimated 13 million Americans play fantasy football across major online fantasy sports sites.

Fantasy sports games include contests that allow fantasy sports participants to act as the owner/manager of a fantasy sports team and to select one or more real-life players whose success or lack thereof in real sporting events determines the success of the fantasy sports participants. Several variations applicable to team sports involve a fantasy sports participant building a fantasy team that includes one or more real life players. The fantasy team competes against other fantasy teams based on statistics generated by the real individual players or teams of a professional, or in some case a collegiate or other amateur, sport. Currently available variants of fantasy leagues based on team sports are Rotisserie-style leagues, fantasy points leagues, and salary cap leagues.

Rotisserie-style leagues originated with Rotisserie league baseball in 1980, but have since been applied to other sports with minor variations. In a Rotisserie-style league, fantasy sports participants in the league compete to have an active roster that achieves the largest number of points based on rankings vs. other fantasy teams in the league in each of several statistical categories. For example, in a baseball fantasy league, statistics accumulated by each fantasy sports participant's active roster in statistical categories such as strikeouts; earned run average (ERA); pitcher wins; the ratio of walks and hits allowed per inning pitched (WHIP); saved games; batter hits, runs scored, runs batted in (RBI), and homeruns; and stolen bases are tabulated. The highest ranking fantasy team in each category receives a number of points for that category equal to the number of fantasy teams in the fantasy sports league, the next highest ranking fantasy team in each category receives one point less than the highest scoring team, and so on down to the lowest ranking fantasy team in each category which receives one point. The points received by each fantasy team are totaled across all of the categories and fantasy league standing are determined based on total points per fantasy league team. Similar systems can be used for other sports as well. In a variation of Rotisserie style games, fantasy teams can face off in head-to-head match-ups during scoring periods that are shorter than the full season. The team in each head-to-head match-up with the best performance in each category wins that category. Those points can be totaled either to determine a winner of the head-to-head match-up or for tabulation in season-long standings.

In a fantasy points league, the statistical performances of real players are used to generate a fantasy point score for each scoring period. For example, in football, a touchdown can be worth 6 points, a field goal 3 points, a safety or two point conversion 2 points, and an extra point 1 point. Yardage gained through rushing, receiving, and passing can be converted to fantasy points based on a ratio of yardage to points (for example, 10 rushing yards=1 fantasy point). Optionally, one or more negative outcomes, for example fumbles, interceptions, and lost yardage, can be worth negative points. Defensive players can also be included with points accumulated for defensive touchdowns, sacks, interceptions, fumbles recovered, etc. In baseball, hits, runs, RBIs, homeruns, stolen bases, and walks for a batter can each be worth some number of points while strikeouts, double plays, being caught stealing, etc. can lead to negative points. Pitchers can score positive points for each inning completed, winning a game, striking out a batter, etc. and lose points for allowing runs, walks, hits, homeruns, etc. The points accumulated by real players on each fantasy sports participant's active roster can be totaled and compared to the points scored by the other fantasy teams of other fantasy sports participants in the league. Season long points standings can be kept, or alternatively the points can be used to determine the winner of head to head match-ups between teams during each of several scoring periods during the season.

Generally, in fantasy point and Rotisserie-style fantasy leagues, each real sports player can appear on only one fantasy league team roster at a time. Real sports players are allocated to the roster of the fantasy team of each fantasy sports participant through one or more methods such as drafts, auction, or the like. Participants can exchange players from their fantasy league team rosters through trades with other participants or by acquiring "free agent" players from a pool of real players that are not currently on another fantasy league team roster. In general, the league rules specify roster limits to which each fantasy team in the league must adhere. The roster limits can include one or more of a maximum and/or minimum number of real players that can be on a team roster, a maximum and/or minimum number of real players that can be "active" for a fantasy team during a scoring period, and a maximum and/or minimum number of real players at each team sport position that can be active during a scoring period. In some cases, the participant rosters can be sized such that each roster includes more players than are necessary to fill an active roster according to the rules of the fantasy league. In this case, before each scoring period that can include one or more games or matches, a participant must decide which players on his or her roster should be active for that scoring period and which should be inactive or "benched."

In a salary cap league, fantasy league participants select players for their active roster from all of the real players in the league, conference, etc. upon which the fantasy league is based. Each real player is assigned a salary number based on that real player's part performance. Each fantasy sports participant is given a fixed amount that can be spent on the total salary of the real players on the fantasy sports participant. If a real player's performance increases or decreases during the season, the salary number assigned to that player can increase or decrease, respectively. In some variations, the fantasy sports participant can take advantage of an increase in the salary value of a real player by trading one or more real players for one or more other real players with a comparable total salary to the real players that are being traded. A fantasy sports participant can thereby increase the available salary cap number by trading real players that have experienced a recent increase in salary value for other real players who the fantasy sports participant perceives as currently having an reduced salary relative to the real player's value that is likely to increase due to improved real player performance. Any real player in the real sports league, conference, etc. upon which the fantasy league is based can be on any fantasy sports participant's fantasy roster at any time. As such, it is possible in this system for more than one fantasy sports participant to simultaneously have the same real player on his or her fantasy roster. The fantasy sports participants in the fantasy league compete to accumulate the best statistical performance from the real players on their fantasy sports roster throughout the season.

SUMMARY

In one aspect of the current subject matter provides a computer implemented method in which a selection by a fantasy sports participant of a fantasy roster is received, for example by a server comprising at least one processor, for a first game period. The fantasy roster includes one or more selected real players selected by the fantasy sports participant from a pool of eligible real players who are eligible for use by the fantasy sports participant during the first game period. Statistics representative of performance of the selected real players during the first game period are recorded, and a total season score for the fantasy sports participant is adjusted based on the recorded statistics. The pool of eligible real players for use by the fantasy sports participant during a second game period that follows the first period is adjusted by deleting the selected real players from the pool.

In optional variations, one or more of the following features can be included. The pool of eligible real players can be initiated for use by the fantasy sports participant during an initial game period of a fantasy sports season such that the pool of eligible real players includes a number of real players who play a first sports position in a team sport upon which the fantasy sports season is based. The number of real players can be greater than a total number of game periods in the fantasy season. The total number of game periods in the fantasy season can be set according to $GP \leq RT \times RPPT$, where GP is the total number of game periods, RT is a number of real teams in the team sport, and RPPT is a number of real players per real team who play the first sports position during a game of the real sport.

Each game period of the total number of game periods can include more than one game by each real team. More than one use of each real player by the fantasy sports participant during the season can be allowed according to $AU \geq GP \div (RT \times RPPT)$, where AU is a number of allowed uses of a real player per fantasy season, GP is the total number of game periods, RT is a number of real teams in the team sport, and RPPT is a number of real players per real team who play the first sports position during a game of the real sport.

The method can also further include receiving, in a subsequent game period to the first game period, a second selection of a real player who was one of the one or more selected real players of the fantasy roster for the fantasy sports participant in the first game period. The second selection of the real player to become part of a second fantasy roster for the fantasy sports participant during the subsequent game period can be allowed, and the statistics for the first game period can be adjusted to delete those statistics generated by the real player during the first game period. In this variation, the fantasy sports participant can be queried for a verification that the fantasy sports participant agrees to a penalty that includes the deleting of those statistics generated by the real player during the first game period. The verification then must be received before the allowing of the sue of the player and the adjusting of the statistics for the first game period.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the current subject matter can provide one or more of the following advantages as well as other possible benefits. For example, a fantasy sports league using the current subject matter can allow participation by any number of fantasy league participants where traditional fantasy sports leagues are generally limited by the number of available real players. A fantasy league participant need not be limited to using only a small subset of the real players or competitors, but can instead use any available player on his or her roster each week. Because the use by each fantasy league participant of an individual real player or competitor is limited to once per season, a significant amount of strategy is involved in choosing the best match-up to use each real player or competitor.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is a table showing one possible roster configuration for a fantasy football league according to the current subject matter; and FIG. 3 through FIG. 6 are tables illustrating an example of user interface views for selection of real players by a fantasy sports participant according to an implementation of the current subject matter.

When practical, similar reference numbers denote similar structures, features, or elements.

DETAILED DESCRIPTION

According to various aspects of the current subject matter, a fantasy sports game can include the ability of any fantasy sports participant in a league to have any real player in the underlying real sports league, conference, etc. at any time. There is a restriction on real player usage by a fantasy sports participant, however, in that each fantasy sports participant can use each real player on his or her active roster only once per fantasy sports season, which can include all or part of a season of the corresponding real sport. Statistics accumulated by real players on the active roster of a fantasy sports participant are tabulated according to a selected scoring system, which can in some implementations be a fantasy points, Rotisserie-style, or other scoring system. The tabulated statistics are used to compare and rank the fantasy sports participants in the fantasy league. The season is divided into a number of scoring periods. During each scoring period, each fantasy sports participant selects a roster having a number of real players at each position according to roster limits set by the fantasy league rules. The fantasy sports participant can select any player from a pool of available real players for each position. After each scoring period, the pool of available real players for each fantasy sports participant is updated by removing the real players used by the fantasy sports participant in the preceding scoring period. Thus, a fantasy sports participant who wishes to be successful at the game should strive to use each real player during the scoring period when the real player has the best statistical output of the season. The current subject matter can be used in conjunction with a fantasy sports league referred to as a "suicide fantasy sports league" to denote that real players are progressively eliminated from a fantasy sports participants available player pool after they are used in an active roster during a scoring period.

Figure 1:
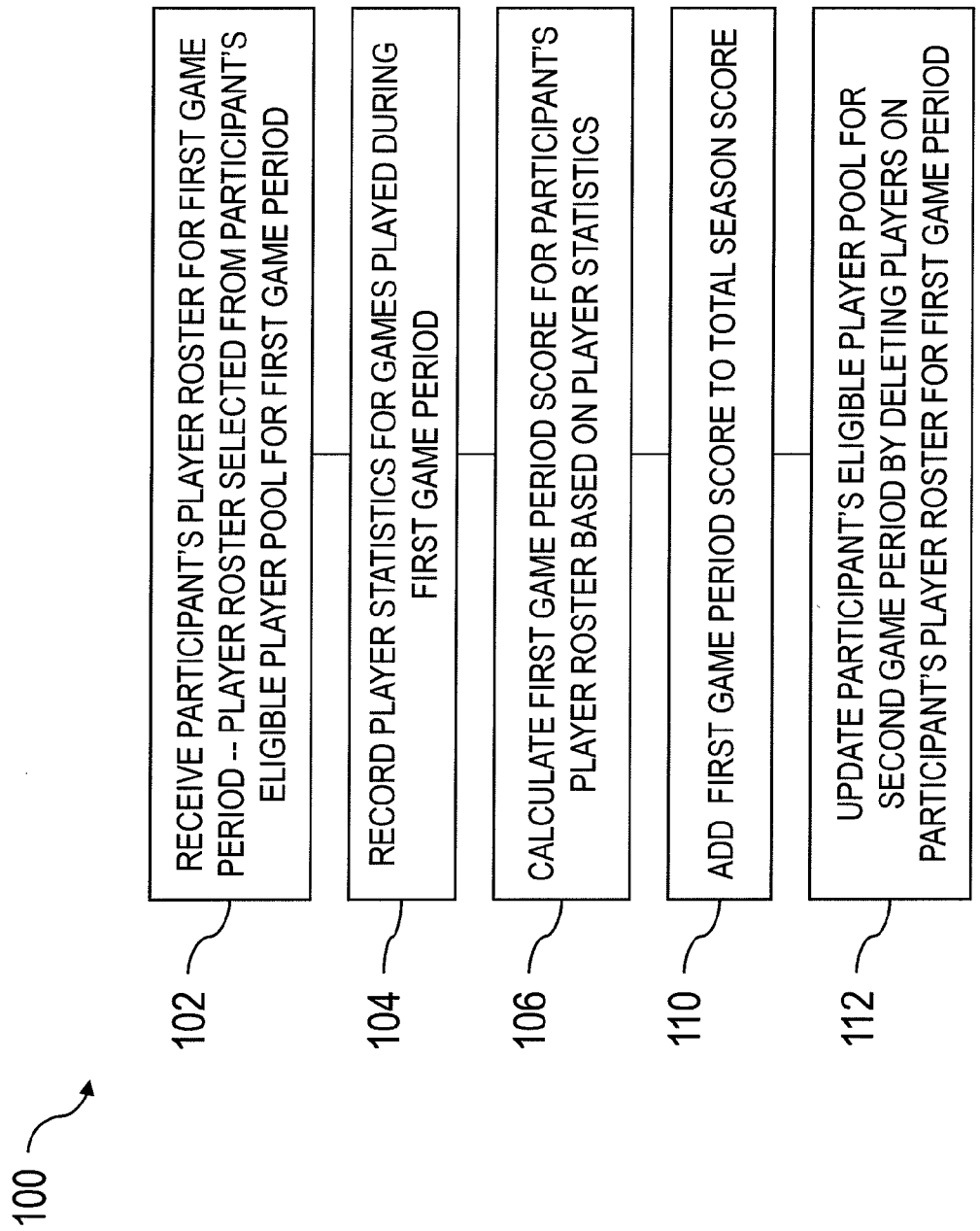
FIG. 1 is a process flow diagram illustrating a computer-implemented method for playing a fantasy sports game.

FIG. 1 shows a process flow chart 100 that illustrates various features of a method for a suicide player pool fantasy sports game. At 102, a computer receives a selection of a fantasy sports participant's player roster for a first game period. The fantasy sports participant's player roster is selected from the fantasy sports participant's eligible player pool for the first game period. It should be noted that the descriptions, figures, and claims included as part of this disclosure use the terms "first" and "second" to denote relative, not absolute sequential order. In other words, the "first" game period as described is not necessarily the overall first game period in a sports season. The "first" game period does, however, occur prior to the "second" game period. At 104, player statistics are recorded for real players for games that are played during first game period. Based on these statistics, at 106 a first game period score is calculated for the fantasy sports participant's player roster. The first game period score is added to a total season score at 110. If the first game period is the actual first period of the fantasy sports season, the total season score at the end of the first game period is the first game period score. The fantasy sports participant's eligible player pool is updated for a second game period at 112 by deleting players used on the fantasy sports participant's player roster during the first game period from the fantasy sports participant's eligible player pool. In this manner, a fantasy sports participant is restricted to using a given real player only once during a season.

For sports in which real players have designated positions, the fantasy league rules can specify a number of real players that must be used on the fantasy sports participant's active roster for each game period. For example, in an implementation based on American football (for example a professional league such as the National Football League™ or one or more collegiate or high school conferences) the fantasy league rules could specify an active roster requirement of some set number of quarterbacks, running backs, wide receivers, tight ends, and kickers. Scoring by defensive and special teams players can also be added. In one implementation, a football fantasy league according to the current subject matter can have an active roster requirement of one quarterback, two running backs, two wide receivers, and a kicker.

One implementation of a survivor player pool fantasy sports game can be used in conjunction with a real American football league, for example the National Football League™ (NFL) or one or more National Collegiate Athletic Association (NCAA) conferences or divisions. During each week of the football season, each fantasy sports participant in a fantasy league selects specific players for each position from a pool of real players. The pool of real players available at each position is defined before the season begins. Each real player in the pool of real players can be used by each fantasy sports participant only once during the season.

Unlike many currently available fantasy sports games that use a draft or an auction prior to the season and trades or a free agent pool and/or a waiver process during the season for assigning a real player to only a single fantasy league team at any one time, a fantasy sports game according to the current subject matter allows multiple fantasy sports participants in the same league to use the same real athlete or competitor on their roster at the same time. However, because each real player can be used only once during the season, strategy in choosing when to use each specific real player becomes quite important. Maximization of the points scored by a fantasy league team during the season involves predicting when a real player is likely to have his or her peak performance—for example because the real player has one or more real game match-ups versus an opponent or opponents against whom the real player is expected to perform well—and then using that real player during the corresponding fantasy league scoring period. Also unlike existing fantasy sports games, a fantasy league based on the currently disclosed subject matter does not have an upper limit on the number of fantasy sports participants who can participate. In contrast, in a league in which each real player can appear on only one fantasy sports participant's roster in the fantasy league at any given time, the feasible number of fantasy sports participants in the fantasy league is limited by the number of real teams in the league, conference, or division from which the statistical performance of the real players is obtained. For example, if a conventional fantasy football league based on the NFL has 35 fantasy teams in the league and each fantasy league team is required to start one quarterback on its active roster, three of the fantasy league teams would not be able to start a quarterback who is likely to start for his real team because there are only 32 teams in the NFL. Many fantasy leagues limit the number of fantasy sports participants to some fraction, typically half or less, of the number of real teams in the real sports league, conference, or division from which the statistical performance of the real players is obtained. This allows each fantasy sports participant to have a bench roster with extra real players at each position to cover for injuries that occur to the real players, bye weeks during which one or more of the real players on the fantasy sports participant's roster do not play, and/or to allow the fantasy sports participant to choose from scoring period to scoring period which real players to "start" and which ones to "bench." No such limitations occur in games according to the current subject matter because each real player can appear on any number of fantasy sports participant's rosters during the same scoring period subject to the limitation that the real player can be used during only one scoring period of the season by each fantasy sports participant.

Similarly, the current subject matter differs in significant and non-obvious ways from a salary cap based fantasy sports league. As noted above, a salary cap league rewards a strategy that is similar to long-term stock investing—adding a real player or competitor when his or her game salary is low can be advantageous if that real player or competitor subsequently improves and is therefore assigned a significantly larger game salary. The increase in the game salary of the real player or competitor allows a fantasy league participant who has that real player or competitor to then use the extra salary cap space to sign another player or players whom the fantasy league participant perceives as currently undervalued. The current subject matter does not require this artificial construct of game salaries. Each player in the available player pool can be used by each fantasy league participant only once per season. The rule is concise and easy to understand and does not require constant monitoring of the instantaneous relative values of a large number of real players in order to assemble a successful roster. Rather, in a game played according to the current subject matter, a fantasy league participant's success is determined by his or her ability to correctly identify not merely the best real players or competitors, but rather those real players or competitors who are likely to have their best statistical performance in a specific scoring period. To optimize his or her score, a fantasy league participant might examine the schedule of opponents that a given real player or competitor is to face during the season and decide which opponent is most likely to result in the best statistical output by that real player or competitor. In some scoring periods, a fantasy league participant might choose to use a real player or competitor who has not performed well statistically throughout the season and who is not expected to produce truly outstanding season-long statistical performances. However, that real player or competitor might be facing a real team against whom he or she has historically performed very well or that has a particularly inept defense that might allow the real player or competitor to produce a very good statistical performance. Because of the requirement that each real player or competitor can be used only once, a fantasy league participant who manages to identify and take advantage of such statistical performance outliers can give himself or herself a substantial advantage over other fantasy league participants.

In one possible implementation, a fantasy sports participant can be given one (or alternatively more than one) opportunity to re-use a real player during the course of the season. For example, the fantasy sports participant can, once (or more times per season) use a real player a second time, for example in a subsequent scoring period after one in which the fantasy sports participant used the real player. This re-use of the real player can include the penalty that the fantasy sports participant is given a "zero" for the statistical output of the real player for the original scoring period in which the fantasy sports participant used the real player. Thus, for example if a fantasy sports participant in a fantasy league according to the current subject had selected Drew Brees as his or her quarterback for a scoring period in which Drew Brees sustained an injury early in the game and therefore missed the remainder of the game and did not accumulate the statistical performance expected by the fantasy sports participant, that fantasy sports participant could take a zero for his or her quarterback position in that scoring period in exchange for the chance to use Drew Brees again in a subsequent scoring period.

In another implementation, a fantasy league according to the current subject matter can include an opportunity for one or more fantasy sports participants who did not join the league in time to start at the beginning of the season to join a league after the season has begun. In one example, prizes awarded in the league can be assigned to fantasy sports participants who scored the most points in the whole season and also in a shortened period starting some time after the beginning of the regular season. A fantasy sports participant who joins the league subsequent to the beginning of the season can optionally be eligible for both the full season and the "second chance" season prizes, as can a fantasy sports participant who joins the league at the beginning of the season. The fantasy sports participant who joins the league subsequent to the beginning of the season would of course be at a disadvantage in participating for the full season prize because he or she would have scored no points in any scoring periods prior to when he or she joined the league.

In some implementations, a fantasy sports participant who fails to select a roster of real players for a scoring period is awarded zero points for the scoring period. Alternatively, if the fantasy sports participant selects only a partial roster, he or she can be awarded zero points only for those roster positions that the fantasy sports participant fails to fill. In another option, if a fantasy sports participant fails to select a valid roster for a scoring period, one or more algorithms can be used to assign an automatically generated roster to that fantasy sports participant. For example, an algorithm can assign the fantasy sports participant a roster for the scoring period that includes a real player at each position whose statistics in the scoring period immediately prior to the current scoring period resulted in the highest fantasy league score among the real players remaining in the fantasy sports participant's available player pool. In another example, an algorithm can assign the fantasy sports participant a roster for the scoring period that includes a real player at each position whose statistics in all scoring periods prior to the current scoring period resulted in the highest total fantasy league score among the real players remaining in the fantasy sports participant's available player pool.

At the end of the season, the fantasy sports participants in the league are ranked according to the total statistics and/or fantasy points accumulated by the active roster selected by each fantasy sports participant in all of the scoring periods of the season. In one example, a first place, a second place, and a third place prize are awarded to the first, second, and third place finishers, respectively. In the event that two or more fantasy sports participants end the season in a tie for one of the prizes to be awarded, the prize can be split between the two or more fantasy sports participants. For example, if two fantasy sports participants were to tie for first place, the first and second place prizes could be combined and split between the two fantasy sports participants. Similarly, in a two-way tie for second place in a fantasy league in which there is a third place prize, the second and third place prizes could be combined and split between the two fantasy sports participants in the tie for second. In general, in a tie between fantasy sports participants, the prizes for the number of prize places that the fantasy sports participants would have received had they not been tied are combined and split evenly among the tied fantasy sports participants. If there are more fantasy sports participants tied than there are prize places (for example in a two-way tie for third when third place is the lowest place to receive a prize), the available prize or prizes are divided between the tied fantasy sports participants.

Alternatively, a tie between two or more fantasy sports participants can be broken to determine a single winner of each prize. Various tie-breaking procedures can be used. For example, the fantasy sports participant in the tie who attained the highest score or best statistics in a single scoring period can be awarded the higher available prize. Other options for breaking a tie can be used as well.

In various implementations, online, real time scoring can be provided via a user interface displayed on a user computer that accesses one or more central servers over a network such as the Internet. Statistics reflecting performance of real players in the league, conference, etc. upon which the fantasy league is based can be obtained in real time, for example from a commercial service that provides such statistics and converted to the scoring or ranking system used by the fantasy league to generate real time scoring. The user interface can in some implementations be a web portal or web page that uses Javascript, Adobe flash or one or more other executable languages or media presentation packages to display real player statistics for players on the fantasy sports participant's current active roster and/or on the rosters of other fantasy sports participants, current scoring period scoring for the fantasy sports participant and/or other fantasy sports participants, total season scoring for the fantasy sports participant and/or other fantasy sports participants, and the like.

In one example of the current subject matter, a game based on real player performance in the NFL has the following roster requirements for each fantasy team each week. For each week of the real regular season, each fantasy sports league participant chooses one quarterback, two running backs, two wide receivers, a tight end, and a kicker for his or her active roster. The available player pool at the start of the season has 30 pre-selected quarterbacks, 60 pre-selected running backs, 60 pre-selected wide receivers, 30 pre-selected tight ends, and 30 pre-selected kickers. For each week of the football season, each fantasy league participant chooses an active roster for the week that includes the required number of real players at each position. The chosen players can only be those that remain in the available player pool for that participant. So, in the first week of the fantasy league season, the fantasy league participant can choose any of the 30 quarterbacks in the original player pool, any two of the 60 running backs in the original player pool, any two of the 60 wide receivers in the original player pool, any of the 30 tight ends in the original player pool, and any of the 30 kickers in the original player pool. In the next week, those real players that the fantasy participant used in the first week are no longer available, so the fantasy league participant chooses any of the 29 quarterbacks remaining in the player pool, any two of the 58 running backs remaining in the player pool, any two of the 58 wide receivers remaining in the player pool, any of the 29 tight ends remaining in the player pool, and any of the 29 kickers remaining in the player pool. This process continues throughout the season. For example, after the $15^{th}$ week of the season, only 15 quarterbacks, 15 tight ends, 15 kickers, 30 running backs, and 30 wide receivers remain in the available player pool of each fantasy league participant. Any two fantasy league participants will have the same available player pool at any given point in the season only if they have used the same players up to that point of the season. The two fantasy league participants having the same available player pool in a given week of the season would have the same score if they had used the same player each week, but if they merely used the same subset of players at each position in different orders, it is more likely that the two fantasy league participants would not have the same score as each real player might have scored a different amount in the two different weeks when the two fantasy league participants used him or her on their fantasy league roster.

FIG. 2 shows a table 200 that lists the positions and scoring categories that can be used in one implementation of a fantasy football game according to the current subject matter. Points scored by a fantasy league participant in a given scoring period can be determined based on the passing, rushing, and/or receiving yards accumulated by each real player on that fantasy league participant's roster for the scoring period as well as the points scored (for example 6 points for scoring a touchdown or throwing a touchdown pass, 3 points for kicking a field goal, two points for scoring a two-point conversion or throwing a pass that results in a two-point conversion, and 1 point for kicking a point after touchdown or "extra point").

FIG. 3 through FIG. 6 a series of representative user interface features that can be used to provide a fantasy sports league consistent with one or more implementations of the current subject matter. The tables 300, 400, 500, and 600 shown in these figures can be displayed to a fantasy sports participant via a web browser interface, for example if the fantasy league is maintained on a server accessible over a network such as the Internet. The example shown is for a fantasy league based on the National Football League™ for a hypothetical fantasy team in week 4 of the 2009 regular season in a fantasy league according to the current subject matter using the roster rules illustrated in FIG. 2. Upon a fantasy sports participant selecting a user interface element corresponding to setting or "drafting" a team for the current week, a draft page table 300 can be displayed with options in a first column 302 for choosing a real player to correspond to each position listed in FIG. 2. A user interface control element 304 can be provided for each position to allow the fantasy sports participant to select which position to choose a real player for that position. The user interface control elements 304 are shown in FIG. 3 as clickable buttons, but can be any other suitable kind of user interface control element.

Upon selection by the fantasy sports participant of one of the user interface control elements 304, a listing of players that could be used at the corresponding position is displayed, such as for example in the table 400 of FIG. 4. In the example shown, the user interface control element 304 corresponding to one of the running back positions has been selected. The table 400 of FIG. 4 shows the top 24 running backs by fantasy points scored at the end of week 3 of the 2009 regular season. More running backs could be viewed by scrolling down through the list of all available running backs in the user interface. The table 400 includes columns for the name 402 of each player, real team that the player plays for 404, position the player plays 406, the real team that each player's real team will be facing in the upcoming week 410, and the number of fantasy points scored by each player through the previously completed week 412 (in this example, through week 3 of 2009). Also included in a column 414 is a user interface control element allowing selection of each player in the player pool who remains eligible for use by the fantasy sports participant in the current week. IN the example shown, Chris Johnson, Julius Jones, Darren Sproles, Correll Buckhalter, and one additional running back outside of the top 24 running backs shown in the table 400 have been previously used by the fantasy sports participant in one of weeks 1 through 3 of the regular season. These players are no longer available for use and therefore do not have a corresponding user interface control element in the column 414. In the table 400, the previously used players are displayed as shaded out. In other implementations, previously used players can be completely removed from the list or indicated as no longer available for use in some other manner.

Figure 5:
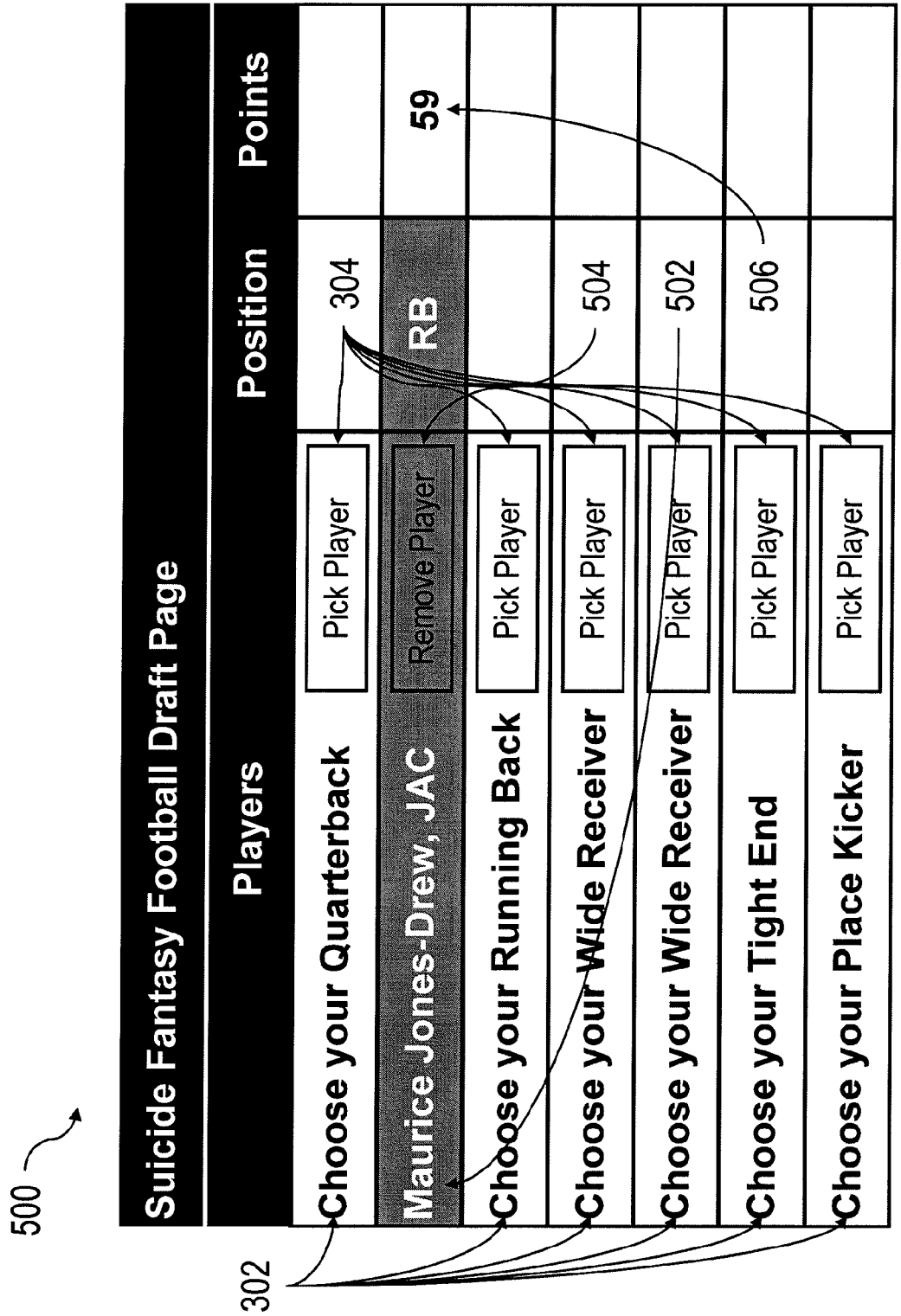

Upon selection by the fantasy sports participant of Maurice Jone-Drew for use in week 4 of the regular season, the table 300 of FIG. 3 is re-displayed as table 500 in FIG. 5 with this player selection in the appropriate position 502 in the first column and the user interface control element 304 corresponding to the selected player having been switched to a second user interface control element 504 that allows the fantasy sports participant to change his or her mind and de-select the selected player. A value 506 for the selected player's fantasy point total amassed prior to the current week can also be displayed in a third column.

Once the fantasy sports participant has made a real player selection for all of the available positions, the table 600 of FIG. 6 can be displayed with a player for each position shown. Once the fantasy sports participant is no longer allowed to make changes to his or her roster, for example a some set time prior to the start of games during the scoring position, and of the user interface control elements 304 allowing selection of a player and second user interface control elements 504 allowing removal of a selected player can be replaced with an indication that the fantasy sports participant's roster is locked.

Similar systems can be used for any sport. Fantasy league participant scores can be based on a conversion of various scoring and statistical performances of real athletes or competitors into "fantasy points" (such as for example that described above for football and baseball). Alternatively, the statistics accumulated by the real players on a fantasy league participant's roster during all of the scoring periods during the season can be aggregated and ranked against the performance of the rosters of other fantasy league participants according to a Rotisserie-style scoring system. For example, in a baseball fantasy league, the fantasy league participant whose roster has accumulated the most homeruns could receive the highest score in the homerun category while the fantasy league participant with the second highest total receives the next highest score. The total numbers of hits, walks, strikeouts, stolen bases, runs batted in (RBI), runs scored, etc. can likewise be tallied for each fantasy league participant in a baseball fantasy league and rankings in each category compiled. An example of an active roster requirement for a baseball league includes one position player at each position (for example a catcher, first baseman, second baseman, shortstop, third baseman, left fielder, center fielder, and right fielder), and one or more starting pitchers and relief pitchers (for example four starting pitchers and two relief pitchers). Outfielders can optionally be grouped as a single position so that a fantasy sports participant can fill his or her roster by selecting any three outfielders. Scoring periods can be determined as individual calendar weeks of the regular season or by some other method for grouping games into scoring periods. An available player pool can include a number of players at each position that is greater than or equal to the number of scoring periods in the season multiplied by the number of real players at that position that must be used in each scoring period.

For basketball, one or more of points, rebounds, assists, steals, blocked shots, turnovers, and the like can be used as scoring categories. An active roster can include a center, two forwards, and two guards. Other variations are possible. For example, an active roster can include one or more additional players such as a "sixth man" or bench player. Scoring periods can be determined as individual calendar weeks of the regular season or by some other method for grouping games into scoring periods. An available player pool can include a number of players at each position that is greater than or equal to the number of scoring periods in the season multiplied by the number of real players at that position that must be used in each scoring period.

Fantasy leagues for soccer and hockey can use statistics such as saves, goals, and assists to determine scoring. An example of an active roster requirement for soccer could include a goalie, three defenders, three midfielders, and four forwards. In hockey, an example of a roster could include a goalie, two defenders, and three forwards. Other configurations are possible.

As noted above, in an alternative to fantasy points-style scoring, real player rankings can be performed for statistical categories as in a Rotisserie-style scoring format. One or more of that statistics that are ranked can be a value other than an absolute number. For example, one or more of batting average, earned run average, on base percentage, slugging percentage, win loss percentage, etc. can be categories used in a baseball fantasy league; shooting percentage, free throw percentage, points per minute played, rebound per game, etc. can be used in a basketball league; completion percentage, field goal percentage, etc. can be used in a football league; etc.

Individual or other non-team sports, such as golf, car racing (for example NASCAR, Indy car, Formula One, etc.), fishing, boxing, mixed martial arts, bowling, tennis, and the like, the real players or competitors do not play different positions that can be used in assembling a fantasy sports roster. One option for implementing the current subject matter for such sports is to group real players into two or more tiers. For each scoring period in the season, a fantasy sports participant selects a set number of real players from each tier to create his or her active roster for that period. Each tier includes a number of real players that is greater than or equal to the number of scoring periods in the season times the number of real players from the tier that are required for the active roster. The tiers can be set based on one or more factors including but not limited to standings at the end of the previous season or year (for example by real player ranking, money winnings, or the like), total number or tournaments, games, matches, etc. won by each real player, etc. Scoring periods can be determined to conveniently divide a sports season. For example, in golf, tennis, auto racing, fishing, bowling, and other sports that feature periodic tournaments, races or other competitions, each tournament, race, or other competition can be a scoring period. If a season has twenty scoring periods, in one example, the top twenty players by ranking at the end of the previous season could be grouped into a first tier, the next twenty could be grouped into a second tier, the third twenty into a third tier, and so on. For each scoring period, a fantasy sports participant fills out a "roster" by selecting one real player from each tier. Each real player can only be used once per season by each fantasy sports participant. Different configurations of a such a tiering system are within the scope of the current subject matter.

For sports such as that have extremely long seasons, the season can be divided into two or more fantasy sports seasons. The pool of available players for each fantasy sports participant can be reset to the full pool at the start of each fantasy sports season. In this manner, a fantasy sports participant would not be limited to using a particular competitor only once per year. In one example based on the NASCAR season, the racing season year can be divided into two separate sub-seasons with race 1-18 in the first half sub-season and races 19-36 in the second half sub-season. Real competitor selections can be made by fantasy sports participants either by driver name or by car number. Car numbers can be used to account for different drivers sometimes being used in the same car. The car number effectively represents a NASCAR "team" including the pit crew, drivers that drive for that team, etc. Using the car number also allows for a fantasy sports participant to receive points even if a driver is replaced because of injury or any other reason. Each fantasy sports participant can choose a specific car or driver only one time in each 18-race sub-season. Each fantasy sports participant receives points for the position in which the car selected for a given race finishes. For example a fantasy sports participant who picks Jeff Gordon, car #24 receives one point if car #24 finishes first in that race. If the #24 car finishes thirtieth in a race, all fantasy sports participants who selected car #24 for that race would receive thirty points. The object is to finish with the least amount of points at the end of the 18 race sub-season. In one example, a fantasy sports participant whose pick for a given race is awarded the pole position for that race can receive a negative point bonus (for example a negative two point bonus) to his or her score. This pole position bonus can optionally be eliminated for the first week of each pool. In a further variation, one or more bonus races can be included during each sub-season. A fantasy sports participant whose pick for that race wins can receive a negative bonus (for example negative ten points). Bonus races can be designated as the more important or higher profile races during the season. For example, in NASCAR, these could be Daytona, Talladega, and Michigan. If a car chosen by a fantasy sports participant fails to qualify for the race, the fantasy sports participant can automatically receive a points total designated at the start of the season, for example forty-eight points. Ties between fantasy sports participants at the end of the season can be broken in a variety of ways, including but not limited to total race wins, top-5 finishes, top-10 finishes, etc. by cars selected by each fantasy sports participant.

Splitting the real-sports season into more than one sub-season can also be useful in team sports in which the number of teams in the real sports league upon which the fantasy sports league is based has fewer real teams than there are scoring periods in the fantasy sports season. For example, a fantasy sports league based on a college basketball conference such as the Pac-10 might have 15 or 16 one-week scoring periods in which each team plays one or two games per week. As there are only 10 teams in the Pac-10 conference, the fantasy sports season can be broken into a first half pool and a second half pool. Fantasy sports participants start with an available player pool in at the beginning of the regular season and use players according to the roster requirements with players used in a scoring period being unavailable for use in later scoring periods. At the mid-point of the regular season, the available player pools can be reset to their starting condition for each fantasy sports participant and fantasy league play resumes in the second half of the season as in the first half of the season. A real player can be used only once by each fantasy sports participant in each of the first half and the second half of the real sports season. More than two sub-seasons can also be used if desired.

Grouping of games played by real teams in the real sports league upon which the fantasy sports league is based into game periods can be used as well to ensure that sufficient real players are available for all of the game periods in the fantasy sports season. For example, the number of game periods, GP, can be set using the relationship $GP \leq RT \times RPPT$, where RT is a number of real teams in the team sport, and RPPT is a number of real players per real team who play the first sports position during a game of the real sport.

Another optional variation that can also be useful in team sports in which the number of teams in the real sports league upon which the fantasy sports league is based has fewer real teams than there are scoring periods in the fantasy sports season includes allowing the use of a real player for a limited number of times greater than once. Again using the example of a fantasy sports league based on a college basketball conference such as the Pac-10, rather than dividing the real sports season into a first half pool or fantasy sub-season and a second half pool or fantasy sub-season, each player can be available for use a total of twice during a single fantasy sports season that spans the entire regular season of the real sport. In an implementation consistent with this variation, a number of allowed uses of a real player per fantasy season, AU, can be set using the relationship $AU \geq GP \div (RT \times RPPT)$, where GP is the total number of game periods, RT is a number of real teams in the team sport, and RPPT is a number of real players per real team who play the first sports position during a game of the real sport.

Scoring methods for individual sports can including ranking the finishing position of each real player in a scoring period (for example a tournament) and assigning a point value to each place based on the number of real players who competed. For example, in a gold tournament in which 90 real players competed, the winner can receive 90 points for a fantasy sports participant who selected him or her for that scoring period while the second place finisher among the real players is worth 89 and so on. Other options for quantifying real sports success into a fantasy scoring system can be used. For example, in competitive fishing, the total weight of fish caught can be used. In a bracket-style tournament like what is typically used in professional tennis, different point values can be assigned depending on how far into the tournament a real player survives. For example, winning a first round game or match could be worth one point while a second round match is worth two points and a third round match is worth four points.

In some variations, a real player can be added to the available player pool after the start of the season. This could occur if a real player originally in the pool were injured and placed on the disabled list or otherwise designated as unavailable. A new real player at the same position could be added to the available player pool of each fantasy league participant to replace the injured or inactive player. Alternatively, real players who become injured or inactive during the course of the season could not be replaced. This would reward a fantasy league participant who used the injured or inactive real player prior to his or her change to inactive status.

A fantasy sports game according to the current subject matter can be commercialized by offering league hosting via the internet. A league website can be accessed by fantasy sports participants in the league to allow each fantasy sports participant to select his or her active roster for each week. The website serves as a front end to a database that tracks the available player pool of reach fantasy sports participant in the league and also tabulates scores for each fantasy sports participant based on the performance of the real players used in the active roster of the fantasy sports participant. A fantasy sports participant can pay a fee to use the website and to join the league. In some implementations, monetary or other prizes can be awarded based on the standings of fantasy sports participants in the league at the end of the fantasy league season. Prizes can vary in size depending on the fee collected from each fantasy sports participant to participate in the league and/or on the number of fantasy sports participants in the league.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

What is claimed:

1. A method comprising:
receiving, at a server comprising at least one processor, a first selection of one or more entities forming a first roster for a game period of a season by a first participant from a first plurality of available entities that excludes one or more entities selected by the first participant in a previous game period of the season;
receiving, at the server comprising at least one processor, a second selection of one or more entities forming a second roster for the game period of the season by a second participant from a second plurality of available entities that excludes one or more entities selected by the second participant in the previous game period of the season;
generating, by the server, a first score characterizing a real performance of entities forming the first roster in the game period of the season;
generating, by the server, a second score characterizing a real performance of entities forming the second roster in the game period of the season;
initiating, by the server, a display of the first score on a first graphical user interface; and
initiating, by the server, a display of the second score on a second graphical user interface;
adding, by the server and when a number of the one or more entities selected by the first participant are less than a predetermined threshold number, data characterizing a first set of one or more entities to the first roster that have a combined highest score in previous game periods of the season; and
adding, by the server and when a number of the one or more entities selected by the second participant are less than the predetermined threshold number, data characterizing a second set of one or more entities to the second roster that have a combined highest score in the previous game periods of the season.

2. The method of claim 1, further comprising:
calculating, by the server, a first season score for the first participant by combining the first score with a score generated for the first participant for each of one or more previous game periods; and
displaying the first season score on the first graphical user interface.

3. The method of claim 1, further comprising:
calculating, by the server, a second season score for the second participant by combining the second score with a score generated for the second participant for each of one or more previous game periods; and
displaying the second season score on the second graphical user interface.

4. The method of claim 1, wherein:
the first participant competes against the second participant;
the first participant wins against the second participant when a first season score associated with the first participant is more than a second season score associated with the second participant;
the second participant wins against the first participant when the first season score is less than the second season score; and
a tie exists between the first participant and the second participant when the first season score equals the second season score.

5. The method of claim 1, wherein:
the first graphical user interface is executed by a first computing device connected to the server via a communication network, the first computing device configured to be used by the first participant; and
the second graphical user interface is executed by a second computing device connected to the server via the communication network, the second computing device configured to be used by the second participant.

6. The method of claim 5, wherein the communication network is internet.

7. The method of claim 1, wherein each entity is a car uniquely identified by a corresponding car number.

8. The method of claim 1, wherein each entity is data identifying a real player in a sport comprising at least one of: football, baseball, basketball, soccer, hockey, golf, car racing, fishing, boxing, bowling, and tennis.

9. The method of claim 1, wherein:
the one or more entities selected by the first participant for the game period are eligible for selection for the game period by the second participant unless the second participant has previously selected the one or more selected players in previous game periods of the second participant.

10. The method of claim 1, wherein:
each entity is associated with a corresponding tier of a plurality of tiers used to categorize the entities; and
the server requires each of the first roster and the second roster to include at least one entity from each tier of the plurality of tiers.

11. The method of claim 1, wherein:
the combining of the first score with the score generated for each of the one or more previous game periods of the first participant comprises adding the first score with the score generated for each of the one or more previous game periods of the first participant; and
the combining of the second score with the score generated for each of the one or more previous game periods of the second participant comprises adding the second score with the score generated for each of the one or more previous game periods of the second participant.

12. A method comprising:
receiving, at a server comprising at least one processor, a first selection of one or more entities forming a first roster for a game period of a season by a first participant from a first plurality of available entities that excludes one or more entities selected by the first participant in a previous game period of the season, the first plurality of available entities including at least one of the one or more entities selected by the first participant in the previous game period when the at least one entity did not participate in the previous game period;
receiving, at the server comprising at least one processor, a second selection of one or more entities forming a second roster for the game period of the season by a second participant from a second plurality of available entities that excludes one or more entities selected by the second participant in the previous game period of the season, the second plurality of available entities including at least one of the one or more entities selected by the second participant in the previous game period when the at least one entity did not participate in the previous game period;
generating, by the server, a first score characterizing a real performance of entities forming the first roster in the game period of the season;
generating, by the server, a second score characterizing a real performance of entities forming the second roster in the game period of the season;
initiating, by the server, a display of the first score on a first graphical user interface; and
initiating, by the server, a display of the second score on a second graphical user interface.

13. The method of claim 12, further comprising:
calculating, by the server, a first season score for the first participant by combining the first score with a score generated for the first participant for each of one or more previous game periods; and
displaying the first season score on the first graphical user interface.

14. The method of claim 12, further comprising:
calculating, by the server, a second season score for the second participant by combining the second score with a score generated for the second participant for each of one or more previous game periods; and
displaying the second season score on the second graphical user interface.

15. The method of claim 12, wherein:
the first participant competes against the second participant;
the first participant wins against the first participant when a first season score associated with the first participant is more than a second season score associated with the second participant;
the second participant wins against the first participant when the first season score is less than the second season score; and
a tie exists between the first participant and the second participant when the first season score equals the second season score.

16. The method of claim 12, wherein:
the first graphical user interface is executed by a first computing device connected to the server via a communication network, the first computing device configured to be used by the first participant; and
the second graphical user interface is executed by a second computing device connected to the server via the communication network, the second computing device configured to be used by the second participant.

17. The method of claim 12, wherein each entity is a car uniquely identified by a corresponding car number.

18. The method of claim 12, wherein each entity is data identifying a real player in a sport comprising at least one of: football, baseball, basketball, soccer, hockey, golf, car racing, fishing, boxing, bowling, and tennis.

19. The method of claim 12, wherein:
the one or more entities selected by the first participant for the game period are eligible for selection for the game period by the second participant unless the second participant has previously selected the one or more selected players in previous game periods of the second participant.

20. The method of claim 12, wherein:
each entity is associated with a corresponding tier of a plurality of tiers used to categorize the entities;
the server requires each of the first roster and the second roster to include at least one entity from each tier of the plurality of tiers;
the combining of the first score with the score generated for each of the one or more previous game periods of the first participant comprises adding the first score with the score generated for each of the one or more previous game periods of the first participant; and
the combining of the second score with the score generated for each of the one or more previous game periods of the second participant comprises adding the second score with the score generated for each of the one or more previous game periods of the second participant.

21. A non-transitory computer program product storing instructions that, when executed by at least one programmable processor, cause the at least one programmable processor to perform operations comprising:
receiving, at a computing device comprising at least one processor and to form a roster, a selection for a game period of a season by a participant of one or more entities from a plurality of available entities that excludes one or more entities selected by the participant in a previous game period of the season;

sending, by the computing device and to a server comprising one or more processors that is connected to the computing device via a communication network, the selection of the one or more entities for the game period;

receiving, by the computing device and from the server, statistical data indicative of a real performance of entities forming the roster in the game period and each previous game period of one or more previous game periods of the season collectively; and displaying, on a graphical user interface of the computing device, the statistical data, wherein the server automatically adds data characterizing another one or more entities to the roster when a number of the one or more entities selected by the participant are less than a predetermined threshold number, the automatically added another one or more entities having a combined highest score in previous game periods of the season.

22. The non-transitory computer program product of claim 21, wherein each entity is one of a car and a real player in a sport comprising at least one of: football, baseball, basketball, soccer, hockey, golf, car racing, fishing, boxing, bowling, and tennis.

23. A non-transitory computer program product storing instructions that, when executed by at least one programmable processor, cause the at least one programmable processor to perform operations comprising:

receiving, at a computing device comprising at least one processor and to form a roster, a selection for a game period of a season by a participant of one or more entities from a plurality of available entities that excludes one or more entities selected by the participant in a previous game period of the season;

sending, by the computing device and to a server comprising one or more processors that is connected to the computing device via a communication network, the selection of the one or more entities for the game period;

receiving, by the computing device and from the server, statistical data indicative of a real performance of entities forming the roster in the game period and each previous game period of one or more previous game periods of the season collectively; and displaying, on a graphical user interface of the computing device, the statistical data, wherein the plurality of available entities includes at least one of the one or more entities selected by the participant in the previous game period when the at least one entity was not able to participate for a complete duration of the previous game period.

24. The non-transitory computer program product of claim 23, wherein each entity is one of a car and a real player in a sport comprising at least one of: football, baseball, basketball, soccer, hockey, golf, car racing, fishing, boxing, bowling, and tennis.

25. A system comprising:

a computing device to receive from a participant a selection of one or more entities for a roster from a pool of available entities for a game period, the pool of available entities excluding one or more entities selected by the participant in a previous game period of a season associated with the participant; and a server connected to the computing device via a communication network, the server receiving the selection of one or more entities from the computing device, the server generating statistics characterizing a real performance of entities forming the roster in the game period of the season, the server determining a season score for the participant based on the statistics and statistics generated for each of one or more previous game periods, the server sending the season score for the participant to the computing device that displays the season score for the participant, the server automatically adding data characterizing another one or more entities to the roster that have a combined highest score in previous game periods of the season when a number of the one or more entities selected by the participant are less than a predetermined threshold number.

26. The system of claim 25, further comprising:

another computing device to receive from another participant a selection of one or more entities from another pool of available entities for the game period, the another pool of available entities excluding one or more entities selected by the another participant in a previous game period of the season associated with the another participant, the another computing device displaying a season score for the another participant, the season score for the another participant being determined by the server.

* * * * *